United States Patent [19]
Lawrence et al.

[11] Patent Number: 5,642,756
[45] Date of Patent: Jul. 1, 1997

[54] VALVE MANIFOLD ASSEMBLY

[75] Inventors: John Lawrence, Mendham; Istvan Sandor, Kinnelon, both of N.J.

[73] Assignee: Bio-Chem Valve Inc., Boonton, N.J.

[21] Appl. No.: 610,123

[22] Filed: Feb. 29, 1996

[51] Int. Cl.$^6$ .................................................. F16K 11/10
[52] U.S. Cl. .................................. 137/884; 137/271
[58] Field of Search ................................ 137/271, 884

[56] References Cited

U.S. PATENT DOCUMENTS

| | | | |
|---|---|---|---|
| 3,486,519 | 12/1969 | Olson | 137/884 |
| 4,171,559 | 10/1979 | Vyse et al. | 137/271 X |

*Primary Examiner*—John C. Fox
*Attorney, Agent, or Firm*—W. Patrick Quast

[57] ABSTRACT

A valve manifold assembly for processing fluids wherein the manifold member includes respective interface segments to which are secured the valve members. The interface segments typically are counterbored into the faces of the manifold member and include portals connected to passageways internal to the manifold member; and an alignment device such as a pin. The valve member includes a manifold mount body portion which has a complementing alignment member such as an opening. The valve when posited in the counterbored portion, and the pin is aligned with the alignment opening in the manifold mount body portion ensures that the ports in the valve member and the manifold member are properly aligned. A manifold mount body portion of the valve includes an annular groove which coacts with a clamping device to secure the valve in the respective counterbored portion. A sealing gasket surrounds the aligned ports to insure that no fluid leakage occurs between the ports.

9 Claims, 4 Drawing Sheets

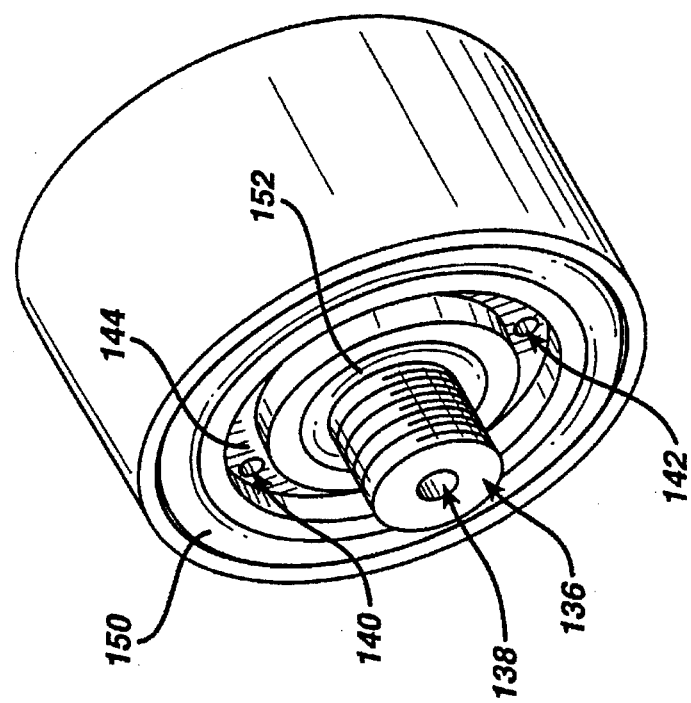
FIG. 5B _PRIOR ART_
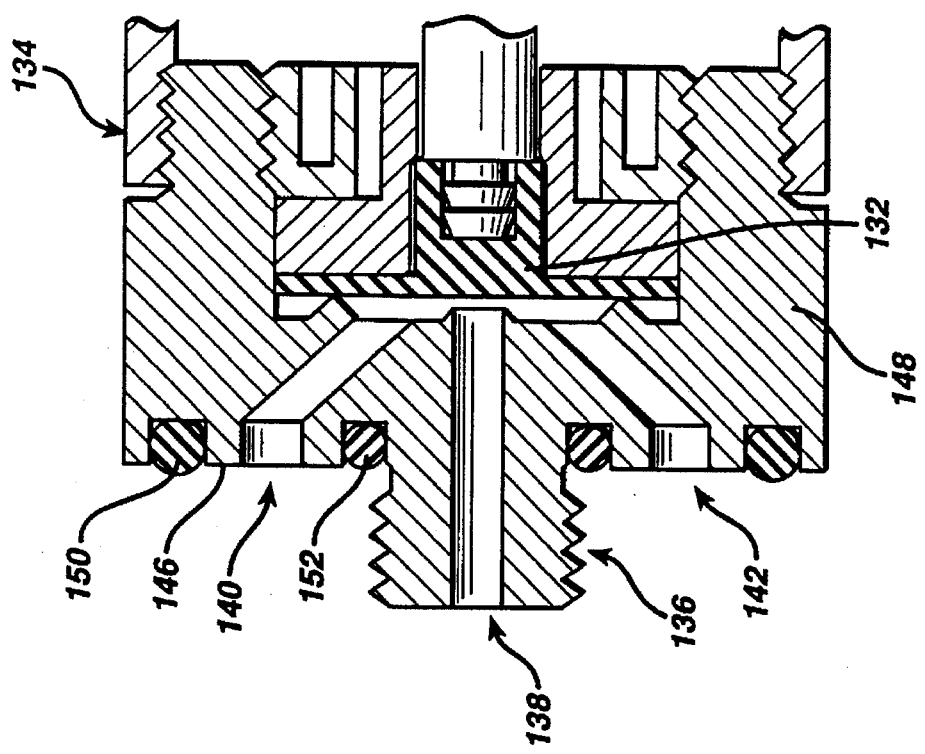
FIG. 5A _PRIOR ART_

VALVE MANIFOLD ASSEMBLY

FIELD OF THE INVENTION

This invention relates to a manifold valve assembly and more particularly a manifold valve assembly which permits field replacement of individual defective valves.

BACKGROUND OF THE INVENTION

Miniature, inert solenoid valves are used extensively in scientific instrument application. Here they are used to control and select high purity and aggressive fluids which have low flow requirements.

Oftentimes a plurality of individual solenoid valves are mounted on a miniature, inert mounting block known as a manifold. The manifold body includes a multiplicity of mounting surfaces upon which individual valves are mounted. Interior to the manifold body is a common passage connecting all valve mounting surfaces to a single source or return; and, a number of branch passages connecting individual valves with its respective fluid source or instrument.

Heretofore manifold assemblies were sold as a unit. The valves were permanently mounted to the manifold body. Thus, if an individual valve in a multiple grouping began to malfunction, the entire manifold assembly, including properly functioning valves, was removed from the test rig and replaced with a complete, substitute assembly. The removed assembly would then be returned by the user to the manufacturer for testing, repair, and/or replacement of the defective valve. This necessarily resulted in high costs for such assemblies.

Various mounting techniques have been employed to secure the valve to the manifold body. In interfacing the valve to the manifold body, it is obviously important that the fluid orifices in the valve communicate with the corresponding openings in the manifold body. In existing units typically, the manifold mount body portion of the valve includes a centrally disposed, threaded valve stem. It includes a first opening which communicates with its counterpart in the manifold body when the valve stem is threaded into a complementing threaded hole in the manifold body. An annular groove or channel is radially disposed in the manifold mount body portion at a distance from the center of the valve stem opening. The channel overlies a second opening in the manifold mount body portion which is connected to the first opening in one portion of the activated valve. A second complementing opening in the manifold body is disposed on the interfacing surface so as to be aligned with the groove in the manifold mount body portion. Elastomeric O-rings disposed on either side of the annular groove in the manifold mount body portion of the valve member isolate the channel so that there is no leakage of the sampled fluid between the first and second openings in the manifold body.

This mounting arrangement unfortunately results in an increase in what is known as dead volume. Dead volume is the potential volume within the manifold-valve assembly in which residual fluids may remain after a test sample is processed. This is an undesireable characteristic in that the contamination of subsequent samplings is increased. Also, sampling data results may be erroneously affected. The dead zone problem is further exacerbated when this mounting technique is used with an inline manifold due to comparatively high internal passageway lengths as contrasted with radial design, manifold bodies.

It is therefore a primary object of this invention to provide a valve-manifold body interface and assembly which permits ready replacement of individual, defective valves without the need to recalibrate an entire multiple valve-manifold assembly.

It is another object of the invention to provide a valve-manifold body interface which significantly minimizes the dead zone problem.

It is still another object of the invention to provide a valve-manifold assembly which minimizes the dead zone problem.

SUMMARY OF THE INVENTION

Towards the achievements of these objects and others which shall become apparent from a consideration of the following description of a preferred embodiment, taken together with the accompanying drawings, there is disclosed an improved valve-manifold assembly for processing fluids. It includes a manifold member having at least one face portion which includes respective interface segments to which are secured respective valve members. The interface segments include first alignment means which coact with second alignment means disposed in a specially configured manifold mount body portion of a respective valve member. The interface segments include a counterbored portion into which the manifold mount body portion of the valve nests. The nesting feature and coacting alignment means insure that the ports in the valve member align with the proper ports disposed in the respective interface segment. Passageways within the body of the manifold member connect the ports in the interface segment with a source of fluid and, typically, a monitoring instrument. Sealing means are disposed about the aligned ports so as to preclude fluid leakage when the valve member is posited in its respective counterbored portion. Clamping means are disclosed which coact with the valve member to secure it to the manifold member. In a preferred embodiment, the manifold mount body portion of the valve member includes an annular groove disposed about the perimeter of the body portion. Clamping means such as a mounting clamp is secured to the face portion of the manifold member on its one end and coact with the annular groove at its second end to affirmatively secure the valve member in its corresponding counterbored portion. The annular groove in the preferred embodiment is disposed just above the top edge of its respective counterbored portion so that the mounting clamp exerts, through leverage, sufficient force to retain the valve member in its location.

The alignment means in the preferred embodiment includes a pin member in the respective interface segment which nests in a corresponding opening in the respective manifold mount body portion. This, together with the nesting of the valve member in the counterbored portion insures that each of the ports in the valve member align with the proper one of the ports in the corresponding interface segment. The invention has application to manifold members of different design including the radial design configuration.

BRIEF DESCRIPTION OF THE DRAWINGS

These and other advantages of the invention will be better understood by those skilled in the art after considering the following description of a preferred embodiment when taken together with the drawings which are as follows:

FIG. 5A is a partial sectional, side elevational view of a prior art valve showing the interface portion of the valve.

FIG. 5B is a perspective view of the interface portion of the prior art valve shown in FIG. 5A.

DESCRIPTION OF THE PREFERRED EMBODIMENT

Figure 1:
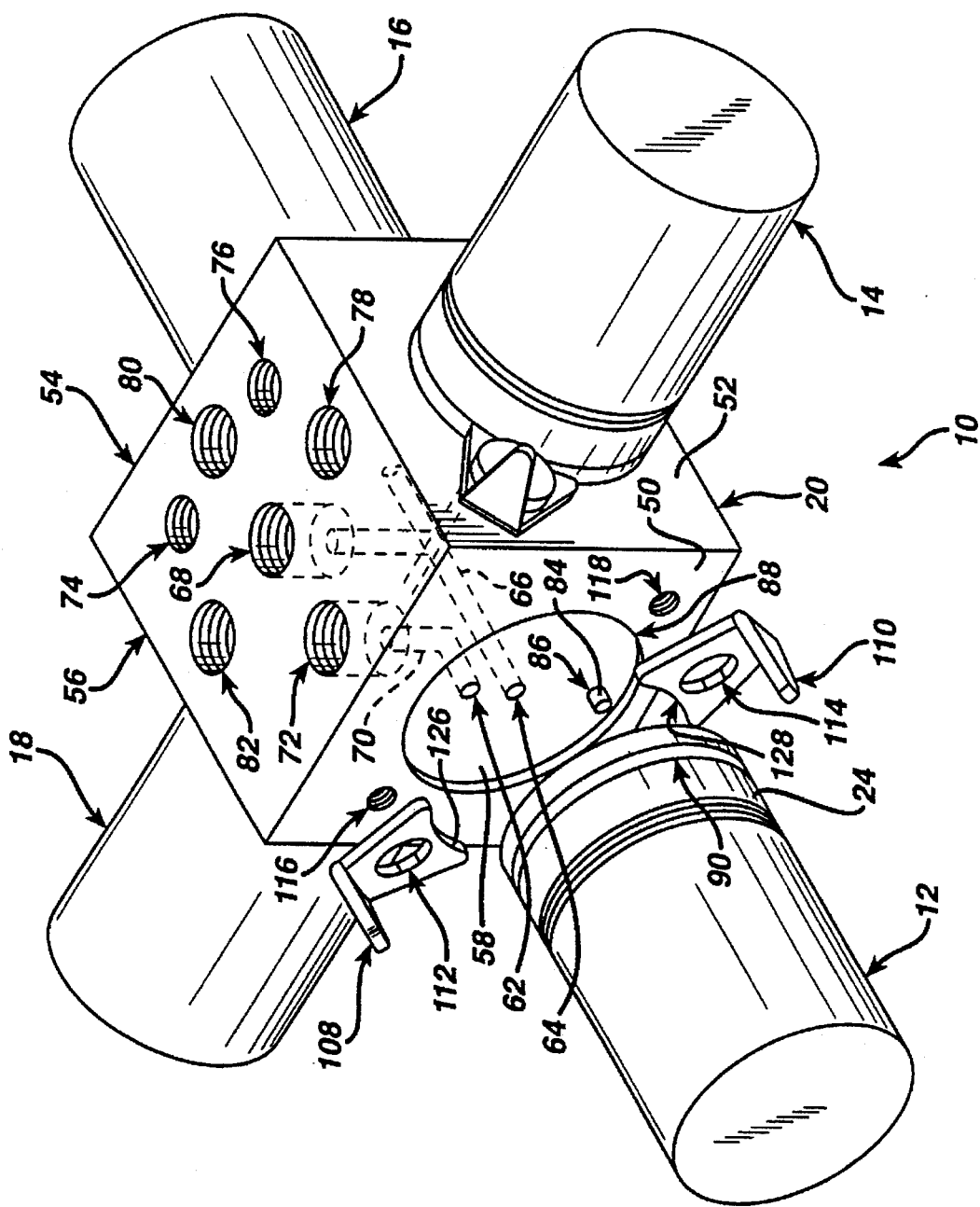
FIG. 1 is a perspective view of the valve manifold assembly of the present invention.

FIG. 1 depicts the valve-manifold assembly 10 of the present invention. In a typical assembly, a plurality of valve members 12, 14, 16, and 18 interface with a manifold member 20.

Figure 2:
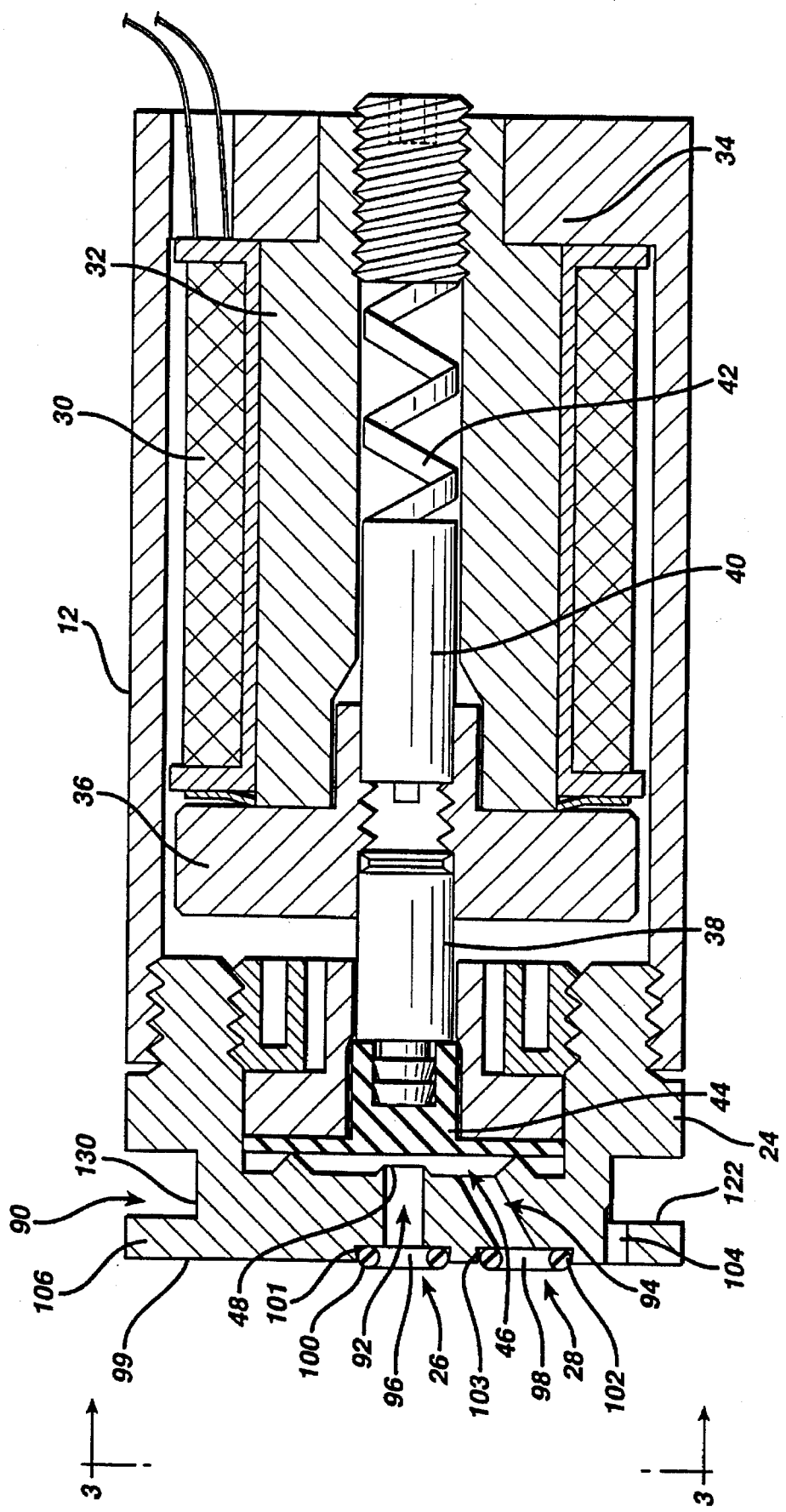
FIG. 2 is a side sectional view of the valve member of the present invention.

FIG. 2 shows, in a side, elevation, sectional view a typical valve member forming a part of the present invention. Valve member 12 as will be described hereinafter, is identical to valve members 14, 16, and 18. The following discussion would relate identically to the description of those valves.

Valve number 12 includes a manifold mount body portion 24 including a first port 26 and second port 28.

The valve member includes valve actuating means comprising electrical coil 30 wound about core 32 with a return flux path through body 34. When energized, armature member 36 is attracted to the coil core member 30–32. When de-energized, spring 42, forming a part of moveable member means 38, 40, and 42, urges the armature 36 away from the coil-core assembly. The moveable means 38–40–42 are connected to a diaphram member 44.

In the energized mode, when the armature 36 is attracted to the coil-core assembly, internal channel 46 communicates between first port 26 and 28 permitting fluid flow therebetween. When the valve is de-energized, as noted, moveable member means 38, 40, and 42 urge the diaphram 44 to the left as viewed in FIG. 2 until it contacts, and seals off first port 26 at internal opening 48.

Referring to FIG. 1, manifold member 20 includes face portions 50, and 52, and 54 and 56 (both not shown). Each face portion, for example 50, includes an interface segment 58 which is a counterbored portion of face 50 having a diameter nominally 0.001 inches greater than the diameter of manifold mount body portion 24. In a typical embodiment, the depth of the counter-bore portion would be a nominal 0.050 inches.

The following description as it relates to interface segment 58, will be identical in detail as relates to the interface segments beneath each of the valve members 14, 16, and 18, all of which are not apparent from the FIG. 1. With regard to interface segment 58, it includes ports 62 and 64. Port 64 is connected via common passageway 66 to a fitting 68. The latter fitting is used to connect the valve-manifold assembly to, for example, a single monitoring instrument, to which each valve supplies fluids from separate locations; or to a common source of fluid, where each valve might be connected to a different instrument for different analyses of the same fluid. Typically the fitting is threaded in order to facilitate this connection. As expected, this common passageway is connected to each of the valves forming the valve-manifold assembly as suggested by the partially shown, dotted depiction. Individual passageway 70 connects the port 62 to threaded fitting 72. Again depending on the nature of the application, the threaded fitting 72 might be connected to an individual source of fluid or a particular analizing instrument. Thru-holes, 74 and 76 are available for securing the valve-manifold assembly to a mounting surface or to a second, similar valve-manifold assembly when it is desired to tandemly arrange such assemblies.

Threaded fittings 78, 80, and 82 are disposed around the perimeter of the manifold member and, again, service the individual valve member 14, 16, and 18 respectively by connecting them either to their respective fluid source or instrument.

Interface segment 58 further includes alignment means which comprises a pin member 84 pressed fitted into a corresponding opening 86. It is positioned, typically, along the radius connecting the centers of port 62 and port 64. Its length is such that after placement in opening 86, the top surface of the pin is below surface 50. This facilitates positioning and nesting of the valve member in the counterbored opening 88.

As noted above, the diameter of counterbored portion 88 is only slightly larger, nominally, than the diameter of manifold mount body portion 24, so that the latter nests snugly in the counterbored portion 88 when assembled. Manifold mount body portion 24 further includes an annular groove 90. Inwardly directed channels 92 and 94 communicate between internal channel 46 and counterbored portions 96 and 98 in face 99 of the manifold mount body portion 24. The counterbored portions 96 and 98, typically, are drilled to a depth of a nominal 0.020 inches. Each of the counterbored portions 96 and 98 include sealing gaskets, such as O-rings 100 and 102. These are retained in the counterbore portions 96 and 98 either by an adhesive and/or by undercutting the counterbores slightly as shown at 101 and 103. The O-rings protrude slightly beyond the plain of the face 99 so as to effect sealing of the aligned ports when the valve is inserted in the counterbored interface segment, for example 58.

Drilled opening 104 is machined into the face 99 to a depth sufficient to accommodate pin member 84.

Annular segment 106 disposed between the face 99 and annular groove 90 for the embodiment described, is nominally at 0.055 inches. When the valve member 12 is assembled into the manifold member 20, segment 106 is positioned into the counterbored portion 88. After initially positioned therein the valve member 12 is rotated until pin member 84 aligns with opening 104. At this point, the manifold mount body portion nests deeper into the counterbored portion 88 and seats on the face of interface segment 58. As noted above, sealing means, for example O-rings 100 and 102 are disposed about the aligned ports 62–98 and 64–96 to provide the necessary sealing thereof so as to avoid fluid leakage.

Once the valve member is nested in the counterbored portion 88, means for clamping the valve member to the manifold member include mounting clamps 108 and 110. These clamps are secured to the manifold member 20 utilizing threaded screws (not shown with respect to valve 12) which are inserted through slotted openings 112 and 114 and into threaded holes 116 and 118. The mounting clamps 108 and 110, once secured to the mounting block 20, need not be removed in order to remove a particular valve member. The slotted openings 112 and 114 permit the mounting clamps to be backed away from the manifold mount body portion to a clearance point so that the valve member can be removed.

Figure 4:
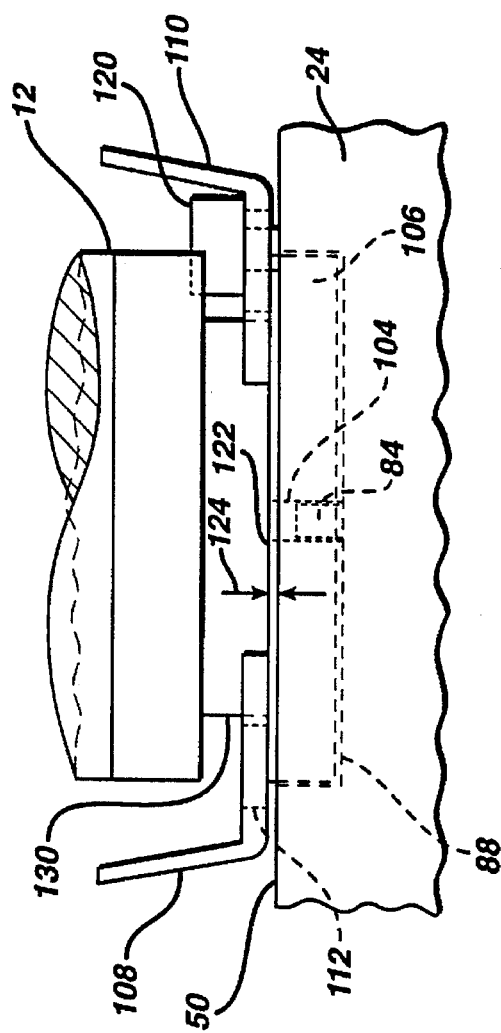
FIG. 4 is a partial, side elevational view showing the interface between the valve member and manifold member of the present invention.
Figure 3:
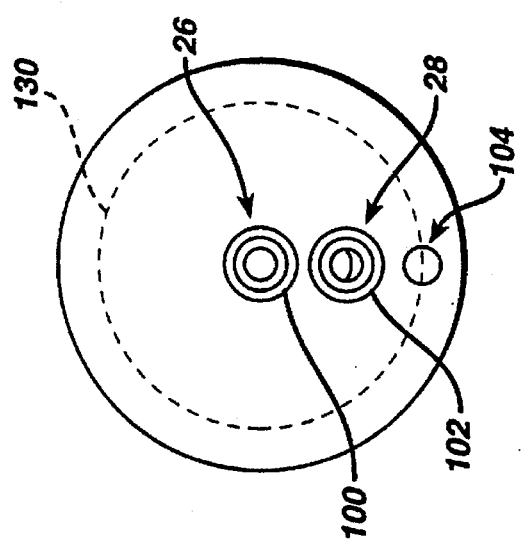
FIG. 3 is view taken along lines 3—3 of FIG. 2.

FIG. 4 depicts a valve member 12 positioned in the counterbored portion 88 with pin member 84 aligned with opening 104. Segment 106 of the manifold mount body portion, for the embodiment depicted is nominally 0.005 inches thicker than the depth of the counterbore in the interface segment 58. Again in the embodiment depicted, first surface 122 of groove 90 is disposed approximately 0.005 inches above surface 50 of the manifold member. The 0.005 inches is the dimension represented at 124. Once the valve member is nested in the counterbored portion, mounting clamps 108 and 110 being first secured by threaded screws, such as 120, are urged, radially inward. Arcuate segments 126 and 128 of the mounting clamps loosely engage the interior surface 130 of the annular groove 90. The screws are threaded into the threaded openings in the manifold member. Because of the 0.005 inches difference, the mounting clamps are slightly angled in relation to surface 50. As such, they exert a downward force on surface 122 of the manifold mount body portion to insure positive retention of the valve member in the counterbored portion. Again, as noted above, the slotted mounting clamps can be retracted a sufficient radial distance so as to permit clearance past the arcuate ends of the clamps, by the manifold mount body portion.

FIGS. 5A and 5B depict a prior art valve device. Valve actuating means, not depicted, are substantially identical to those described earlier and operate upon a moveable member means in a similar manner to urge diaphram means 132 towards or away from the internal opening of the port along its center line. In this prior unit, the valve member 134 was secured to a manifold member not shown by screwing threaded stem 136 into a corresponding hole in the manifold member. The central port 138 is readily aligned with the corresponding port in the manifold member.

Dual ports 140 and 142 communicate with each other via channel 144 which is grooved into the face 146 of the manifold mount body portion 148. The port in the manifold member, again not shown, whose function it is to communicate with ports 140–142, is positioned circumferentially about the circular line representing the median diameter of groove 144. This ensures that the port in the manifold member is aligned with channel 144 so that it communicates with ports 140 and 142. The channel arrangement is an obvious necessity in that it can not be guaranteed where the opening in the manifold member will be in relation to ports 140 and 142 since the location of the latter is not controllable due to the variability of the threaded engagement by stem 136. This arrangement increases the dead volume of the fluid path in that the volume of the channel between ports 140 and 142 now contributes to that dead volume. This is a negative consequence overcome by the present invention. O-ring gaskets 150 and 152 prevent fluid leakage at the interface between the manifold mount body portion and the manifold member.

While a preferred embodiment has been described, it is apparent that adaptations thereof and modifications can be made without departing from the scope of the invention as defined in the following claims. For example, although the valve-manifold assembly is depicted utilizing a radial manifold member, the same principles can be utilized with a so called inline manifold member wherein the individual valve members are positioned linearly along the manifold member. This may not be preferrable, however, because of the continuing insistence by end users of such valves in highly scientific work, to reduce as much as possible the dead volume associated with these assemblies.

What is claimed is:

1. In a valve-manifold assembly for processing fluids, comprising at least one valve member and one manifold member, wherein each said valve member includes a manifold mount body portion having a first port and at least a second port, a valve actuating means operable upon a moveable member means moveable between a first and second position, a diaphragm means connected to said moveable member means for sealing closed said first port when said moveable member means is in said first position, an internal channel means within each said valve member providing for fluid flow between said first port and at least said second port when said moveable member means is in said second position, and wherein the manifold member includes at least one face portion including respective interface segments to which are secured the respective manifold mount body portions of said respective valve members, each of said respective interface segments including a third and fourth port, said manifold member further including a common passageway for fluid flow extending between a means for connecting to a first external device and said third port of each of said respective interface portions, at least two individual passageways each individual passageway entending between said fourth port of each of said respective interface portions, and a respective means for connecting to a corresponding respective external device, wherein the improvement comprises:

(a) each of said respective interface segments including a respective first alignment means;

(b) each of said respective manifold mount body portions including a respective second alignment means;

each of said respective interface segments including a counterbored portion having a perimeter substantially identical in shape and dimension to the perimeter of said manifold mount body portion, each said manifold mount body portion nesting in its respective counterbored portion when said valve member is secured to the interface segment, said first and second alignment means cooperating to ensure that each of the ports in each said interface segment aligns with the proper one of the ports for the corresponding valve member;

(c) said respective sealing means disposed circumferentially about said aligned ports, said sealing means precluding fluid leakage when each said valve member is secured to said respective interface segment; and, (d) means for clamping each said valve member to said manifold member at each respective interface.

2. The assembly claimed in claim 1 wherein each of said manifold mount body portions includes an annular groove having a first and second surface disposed about the perimeter of said body portion, said means for clamping including means for coacting with said annular groove.

3. The assembly claimed in claim 2 wherein said first surface of said annular groove is disposed above the top edge of its respective counterbored portion when the corresponding valve member is fully nested in its respective counterbored portion.

4. The assembly claimed in claim 3 wherein said clamping means includes at least one mounting clamp, said mounting clamp including a first segment which is secured to the face portion surrounding the respective counterbored portion and a second segment which coacts with said first surface of said annular groove so as to retain said valve member in its fully nested and aligned position in its respective counterbored portion.

5. The assembly claimed in claim 1 wherein said respective sealing means includes gasket means disposed in corresponding annular grooves circumferentially disposed about said first and second ports in said manifold mount body portion.

6. The assembly claimed in either claim 1, 2, 3, 4, or 5 wherein said first alignment means includes a pin member in said respective interface segment and said second alignment means includes an opening in each said manifold mount body portion, wherein the placement of said pin member in said opening when the valve member is nested in its counterbored portion ensures that each of the ports at each said interface segment align with the proper one of the ports for the corresponding valve member.

7. The assembly claimed in claim 6 wherein said manifold member is of radial design, said manifold member having at least two face portions each including at least one of said respective interface segments.

8. The assembly claimed in claim 6 wherein said pin member is below the plane of said face portion.

9. The assembly claimed in claim 3 wherein said mounting clamp includes a slotted opening which permits said mounting clamp to be urged away from said manifold mount body portion while still secured to the face portion, when it is desired to remove said valve member from its respective counterbored portion.

* * * * *